United States Patent [19]

Kaya et al.

[11] 4,430,573
[45] Feb. 7, 1984

[54] LOAD CONTROL FOR ENERGY CONVERTERS

[75] Inventors: Azmi Kaya, Akron; Marion A. Keyes, Chagrin Falls, both of Ohio

[73] Assignee: The Babcock & Wilcox Company, New Orleans, La.

[21] Appl. No.: 330,994

[22] Filed: Dec. 15, 1981

[51] Int. Cl.³ .............................................. G05B 15/00
[52] U.S. Cl. .................................. 290/40 R; 60/39.03
[58] Field of Search .............. 290/40; 60/39.02, 39.03, 60/39.2, 645

[56] References Cited

U.S. PATENT DOCUMENTS 4,168,608  9/1979  Uram .................................. 60/39.03
4,179,742  12/1979  Stern et al. .................... 290/40 R X
4,222,229  9/1980  Uram .................................. 60/39.03

*Primary Examiner*—J. V. Truhe
*Assistant Examiner*—W. E. Duncanson, Jr.
*Attorney, Agent, or Firm*—John F. Luhrs; Vytas R. Matas; Robert J. Edwards

[57] ABSTRACT

A load control for a system comprised of a plurality of energy converters wherein increases in total energy demand from the system is compensated by increasing only the rate of energy conversion of that converter producing energy conversion at least cost and decreases in total energy demand from the system is compensated by decreasing only the rate of energy conversion of that converter producing energy conversion at highest cost.

3 Claims, 1 Drawing Figure

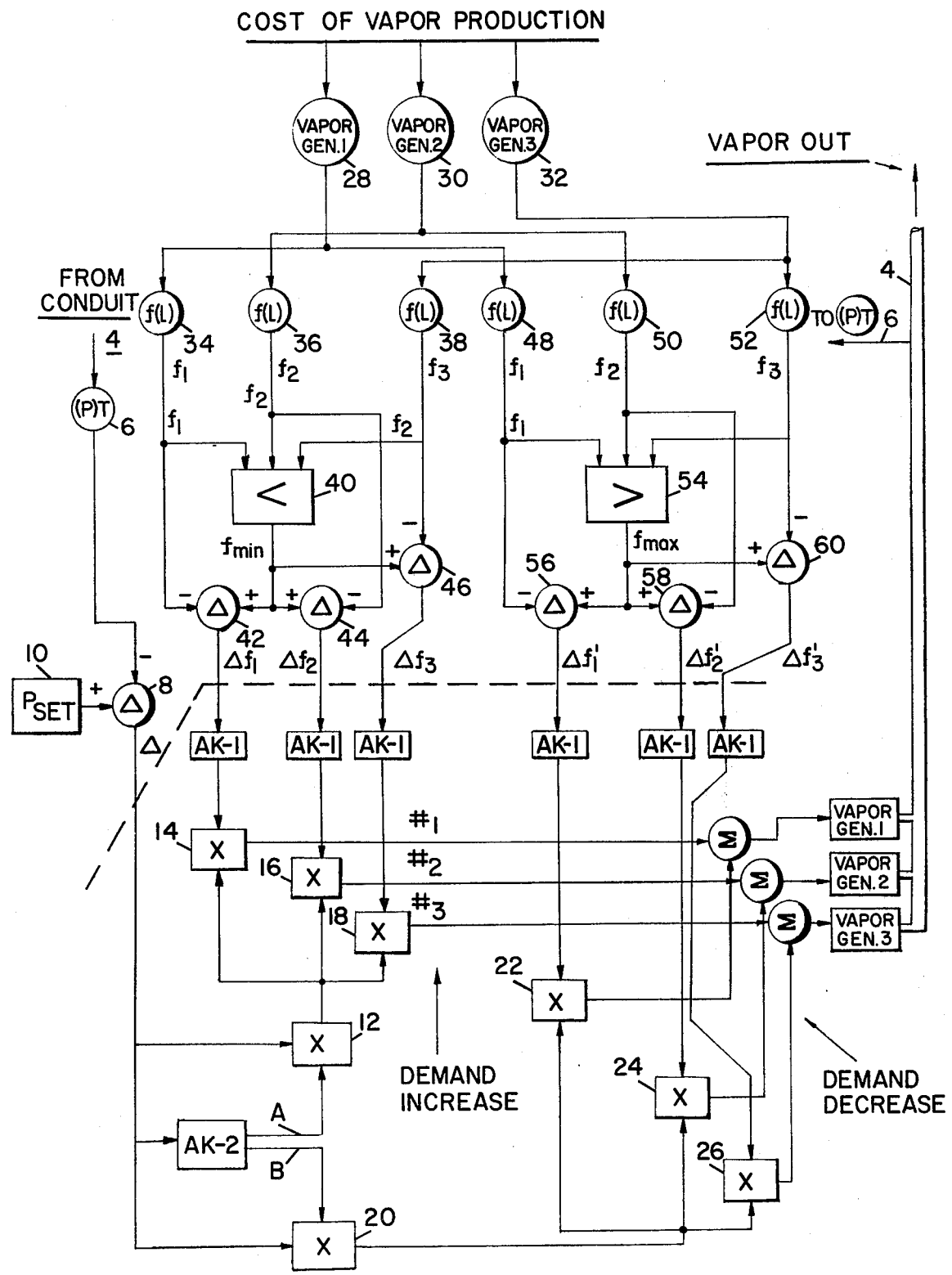

4,430,573

LOAD CONTROL FOR ENERGY CONVERTERS

TECHNICAL FIELD

This invention relates to the automatic load control of a system comprised of a plurality of energy converters, such as, but not limited to, vapor generators, turbines, blowers, chillers, fans, pumps, compressors, heat exchangers. More particularly the invention relates to a load control which, upon an increase in system load, assigns the demand change to the converter having the lowest cost of production and, vice versa, upon a decrease in system load assigns the demand change to the converter having the highest cost of production.

BACKGROUND ART

State of the art load control for systems comprised of a plurality of energy converters adjust the rate of conversion of all converters in parallel to satisfy a change in system demand without consideration of differences in the cost of production of the converters, or additionally, which, under prolonged steady-state conditions gradually redistribute the system load among the converters so that all are operating at the same incremental cost. Frequently the required prolonged steady-state conditions are not practically attainable and hence the advantages of the so-called incremental load control are not attainable. It is therefore an objective of this invention to provide a control which satisfies a change in demand by adjusting the rate of production of that converter which will reduce the system unit production cost to the lowest practical attainable amount.

It is a further objective of this invention to provide such a control constructed of rugged and simple components suitable for use in industrial environments.

Still another objective of this invention is to provide such a control composed entirely of simple, discrete logic components to the end that the cost of the control is materially less and the reliability materially greater than controls utilizing computers with high level software.

These and other objectives will be apparent as the description proceeds in connection with the drawing in which:

IN THE DRAWING

The drawing is a logic diagram of a load control, embodying the principles of this invention, as applied to a system comprised of a plurality of vapor generators.

DETAILED DESCRIPTION

In the drawing and in the following description conventional logic symbols have been used and described. It will be recognized that the components, or hardware as it is sometimes called which such symbols represent, are commercially available and their operation well understood by those familiar with the art. Further, conventional logic symbols have been used to avoid identification of this invention with any particular type of components such as analog or digital, as this invention comprehends either one, or a combination of such types.

In the drawing there are shown vapor generators 1, 2, and 3 supplying vapor to a header 4. A pressure transducer 6, responsive to the pressure in the header 4, generates an output signal varying in proportion to changes in pressure which is transmitted to a difference unit 8 where it is compared to a set-point signal, proportional to the desired vapor pressure, generated in a signal generator 10 and producing a System Control Signal proportional to the difference or error between desired and actual vapor pressure.

The System Control Signal is transmitted to a control action unit AK-2, which upon an increase in the System Control Signal generates an output signal A having a value of (1) and a B signal having a value of (0). Vice versa, upon a decrease in the System Control Signal control action unit AK-2 generates an A signal having a value of (0) and a B signal having a value of (1). An increase in the System Control Signal, by virtue of the A signal having a value of (1) is allowed to pass through a multiplying unit 12 to multiplying units 14, 16, and 18. However, by virtue of the B signal having a value of (0) which is transmitted to a multiplying unit 20, the System Control Signal is inhibited from passing to multiplying units 22, 24, and 26. Upon a decrease in the System Control Signal the reverse action occurs it then being allowed to pass to multiplying units 22, 24, and 26 and inhibited from passing to multiplying units 14, 16, and 18.

By virtue of the apparatus now to be described an increase in the System Control Signal is allowed to pass to the firing controls (not shown) of that generator producing vapor at least cost to thereby increase its output to maintain vapor production equal to demand. Conversely a decrease in the System Control Signal is allowed to pass to the firing controls of that generator producing vapor at highest cost to maintain equilibrium between vapor production and demand.

By computations, well understood by those familiar with the art, there may be generated signals proportional to the cost per pound of vapor generated for each of the generators 1, 2, and 3. Such costs usually vary in functional relationship to generator load. For purposes of this invention, it is sufficient to state that signal generators 28, 30, and 32 generate signals corresponding to the cost of producing a pound of vapor by vapor generators 1, 2, and 3 respectively.

Consider first the means by which, upon a demand increase, the vapor generation of the vapor generator producing vapor at least cost is increased to satisfy the demand increase. The output signals of signal generators 28, 30, and 32 are transmitted to function generators 34, 36, and 38 respectively. Within the normal range of operation these function generators pass the output signals from signal generators 28, 30, and 32 to low select unit 40, without modification, however as a vapor generator approaches its maximum rating, notwithstanding that is producing vapor at least cost, the function generator associated with that vapor generator produces an output signal indicative of a high cost of vapor production and which will be evident as the description proceeds inhibit a further increase in vapor production by that particular generator.

The output signal from low select unit 40 is transmitted to difference units 42, 44, and 46 in which it is compared against the signal outputs from function generators 34, 36, and 38 respectively. There will thus be produced an output signal of (0) from one of the difference units 42, 44, or 46 and an output signal greater than (0) from the other difference units, serving to select the least cost signal from signal generators 28, 30, and 32.

Control action units, identified as AK-1 produce an output signal of (1) when the input signal is (0). An input signal other than (0) produces an output signal of (0).

Multiplying units 14, 16, and 18 permit the System Control Signal to pass to that generator producing vapor at least cost and thus maintain vapor production equal to demand.

Upon a decrease in demand the reverse action occurs in that the vapor generation of that generator having the highest cost of production is reduced to maintain vapor production equal to demand. As shown, the output signals from signal generators 28, 30, and 32 pass to function generators 48, 50, 52 respectively which allows the signals to pass without modification during the normal range of operation of vapor generators 1, 2, and 3 respectively. As a vapor generator approaches minimum rating, however, not withstanding that it is producing vapor at highest cost, an output signal indicative of low cost of production is generated, thus preventing further decrease in vapor generation.

The output signals from function generators 48, 50, and 52 pass through a high select unit 54, the output signal of which identifies the vapor generator producing vapor at highest cost. Difference units 56, 58, 60 transmit one signal of (0) and signals other than (0) to the AK-1 control action units. The control action unit having an input signal of (0) generates an output signal of (1) and an output signal of (0) for all other input signals. Thus by virtue of multiplier units 22, 24, and 26 the System Control Signal passes to that vapor generator having the highest cost of production, reducing the rate of vapor generation as required to maintain equilibrium between vapor production and demand.

We claim:

1. A load control for a system comprised of a plurality of energy converters, comprising, a first means generating a System Control Signal corresponding to system load, means generating signals corresponding to the cost of production of each of said plurality of converters, means selecting the least cost signal from among said last named signals, means generating output signals during an increase in the System Control Signal and means under the control of the System Control Signal and said output signals permitting said System Control Signal to increase the rate of production of the converter having lowest cost of production while inhibiting a change in the ratio of production of the other converters in said plurality of converters to thereby maintain equilibrium between the total rate of energy conversion by said plurality of converters and demand.

2. A load control as set forth in claim 1 further including means under the control of said output signals and said System Control Signal during decreases in the System Control Signal to decrease the rate of production of the converter having the highest cost of production while inhibiting changes in the rates of production of the other converters in said plurality of converters to thereby maintain equilibrium between the total rate of energy conversion by said plurality of converters and demand.

3. A load control as set forth in claim 2 wherein each of said energy converters is a vapor generator.

* * * * *